(12) United States Patent
Yoshida et al.

(10) Patent No.: US 10,756,879 B2
(45) Date of Patent: Aug. 25, 2020

(54) MASTER CONTROL DEVICE AND SYNCHRONOUS COMMUNICATION SYSTEM USING SAME

(71) Applicant: Mitsubishi Electric Corporation, Tokyo (JP)

(72) Inventors: Mikiya Yoshida, Tokyo (JP); Kentaro Ishihara, Tokyo (JP); Toshinori Matsui, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 36 days.

(21) Appl. No.: 16/050,210

(22) Filed: Jul. 31, 2018

(65) Prior Publication Data

US 2019/0222407 A1 Jul. 18, 2019

(30) Foreign Application Priority Data

Jan. 17, 2018 (JP) .................................. 2018-005316

(51) Int. Cl.
*H04L 7/00* (2006.01)
*H04L 12/40* (2006.01)
(Continued)

(52) U.S. Cl.
CPC .......... *H04L 7/0054* (2013.01); *H04L 7/0037* (2013.01); *H04L 12/403* (2013.01); *H04L 12/40019* (2013.01); *H04L 43/0858* (2013.01)

(58) Field of Classification Search
CPC ............. H04L 12/40019; H04L 12/403; H04L 43/0858; H04L 7/0037; H04L 7/0054; H04J 3/0664
(Continued)

(56) References Cited

U.S. PATENT DOCUMENTS

2002/0105933 A1* 8/2002 Higuchi ................. H04B 7/269
370/338
2002/0114354 A1* 8/2002 Sinha .................... H04J 3/0658
370/503
(Continued)

FOREIGN PATENT DOCUMENTS

JP 11-211863 A 8/1999
JP 2004-064123 A 2/2004
JP 2015-023345 A 2/2015

OTHER PUBLICATIONS

Communication dated Feb. 5, 2019, from Japanese Patent Office in counterpart application No. 2018-005316.

*Primary Examiner* — Robert J Lopata
(74) *Attorney, Agent, or Firm* — Sughrue Mion, PLLC; Richard C. Turner

(57) ABSTRACT

A master control device connected to a plurality of slave control devices via a network is configured to include an own local time counted by a counter unit, in a message and transmit the message to the slave control devices by the timing synchronization unit, calculate a difference between a reception time of a message transmitted from the slave control device, which has received the message, at a timing corrected in accordance with the local time and a pre-calculated message reception predicted time by a timing synchronization determination unit, calculate a correction amount for timing of the slave control devices using the difference by a timing synchronization correction unit, add the correction amount to the local time, include the local time in a message, and transmit the message to the slave control devices.

20 Claims, 11 Drawing Sheets

(51) Int. Cl.
*H04L 12/403* (2006.01)
*H04L 12/26* (2006.01)

(58) Field of Classification Search
USPC .......................................................... 370/512
See application file for complete search history.

(56) References Cited

U.S. PATENT DOCUMENTS

| | | | | |
|---|---|---|---|---|
| 2002/0118201 A1* | 8/2002 | Mukherjee | ............ | G06F 3/1438 |
| | | | | 345/504 |
| 2003/0037194 A1* | 2/2003 | Mukherjee | ............ | G06F 3/1438 |
| | | | | 710/260 |
| 2005/0013394 A1* | 1/2005 | Rausch | .................... | G04G 7/00 |
| | | | | 375/356 |
| 2005/0116834 A1* | 6/2005 | Block | ................. | H04B 1/7156 |
| | | | | 340/4.21 |
| 2009/0180465 A1* | 7/2009 | Closset | ............... | H04L 12/4035 |
| | | | | 370/350 |
| 2009/0231191 A1* | 9/2009 | Wu | ......................... | G04G 7/00 |
| | | | | 342/357.395 |
| 2010/0020909 A1* | 1/2010 | Jung | ..................... | H04J 3/0667 |
| | | | | 375/371 |
| 2011/0216816 A1* | 9/2011 | Frenzel | .................... | H04B 1/38 |
| | | | | 375/222 |
| 2012/0224492 A1* | 9/2012 | Kitayama | ........... | H04L 12/4035 |
| | | | | 370/242 |
| 2013/0208735 A1* | 8/2013 | Mizrahi | ................ | H04J 3/0661 |
| | | | | 370/503 |
| 2014/0146811 A1* | 5/2014 | Wen | ...................... | H04J 3/0667 |
| | | | | 370/350 |
| 2014/0241479 A1* | 8/2014 | Someya | ................. | H04L 7/00 |
| | | | | 375/362 |
| 2015/0092797 A1* | 4/2015 | Aweya | ................. | H04J 3/0667 |
| | | | | 370/516 |
| 2016/0294536 A1* | 10/2016 | Biederman | ........... | H04L 5/0044 |
| 2017/0117980 A1* | 4/2017 | Cheng | ................. | H04J 3/0697 |

* cited by examiner

FIG. 6

| 200 | 210 / 201 | 202 |
|---|---|---|
| SLAVE CONTROL DEVICE | 1 | 2 |
| CYCLE OF SCHEDULE TABLE [ms] | 10 | 20 |
| TASK/TIMING [ms]<br>211<br>212<br>213<br>214 | COMMUNICATION MONITORING TASK/3 | COMMUNICATION MONITORING TASK/1 |
| | MESSAGE TRANSMISSION TASK/5 | MESSAGE TRANSMISSION TASK/2 |
| | CONTROL APPLICATION 1 TASK/7 | CONTROL APPLICATION 1 TASK/5 |
| | MEMORY MANAGEMENT TASK/9 | MESSAGE TRANSMISSION TASK/12 |
| | | CONTROL APPLICATION 2 TASK/15 |
| | | MEMORY MANAGEMENT TASK/18 |

FIG. 7

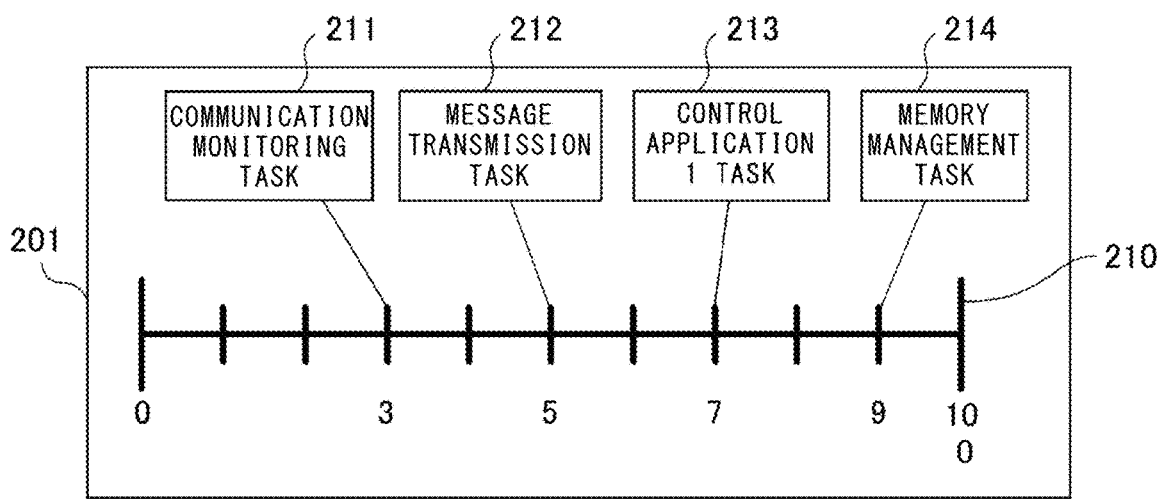

FIG. 9

| SLAVE CONTROL DEVICE | CYCLE OF SCHEDULE TABLE [ms] | ACTIVATION TIMING OF MESSAGE TRANSMISSION TASK [ms] | MESSAGE IDENTIFIER | MESSAGE DELAY TIME [ms] | THRESHOLD FOR PREDICTED TIME [ms] |
|---|---|---|---|---|---|
| 1 | 10 | 5 | 0x111 | 8.3 | 0.5 |
| 2 | 20 | 2, 12 | 0x222 | 7.8 | 0.4 |

300

| SLAVE CONTROL DEVICE | MESSAGE RECEPTION PREDICTED TIME [ms] | MESSAGE RECEPTION TIME [ms] | DIFFERENCE [ms] | THRESHOLD FOR PREDICTED TIME [ms] |
|---|---|---|---|---|
| 1 | 73.3 | 72.5 | 0.8 | 0.5 |
| 2 | 76.2 | 75.6 | 0.6 | 0.4 |

FIG. 14
| SLAVE CONTROL DEVICE | PROVISIONAL CORRECTION AMOUNT [ms] | COUNT NUMBER |
|---|---|---|
| 1 | 0.8 | 2(0) |
| 2 | 0.6 | 2(1) |
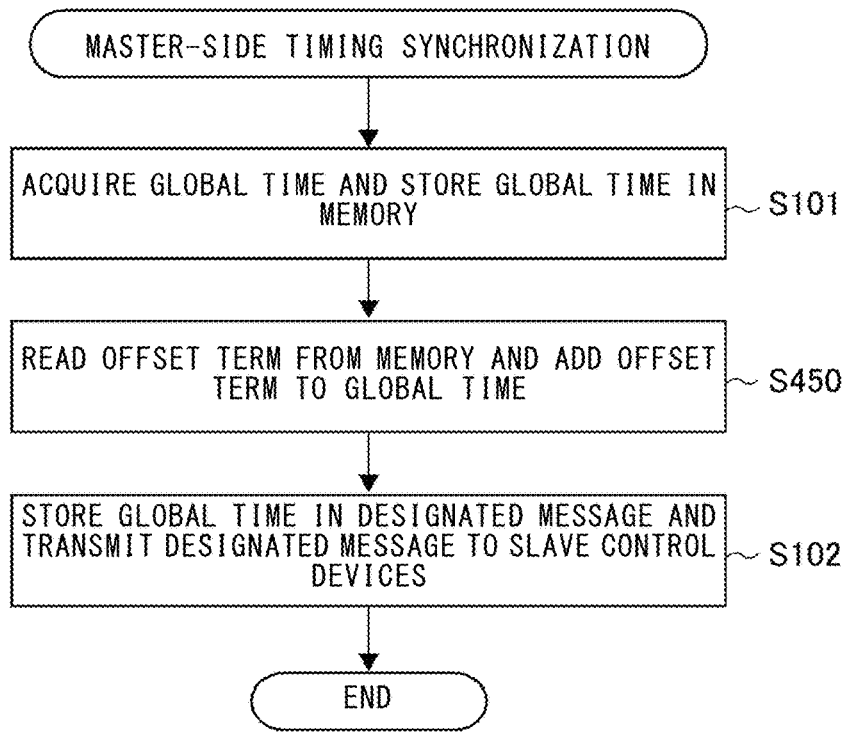
FIG. 15
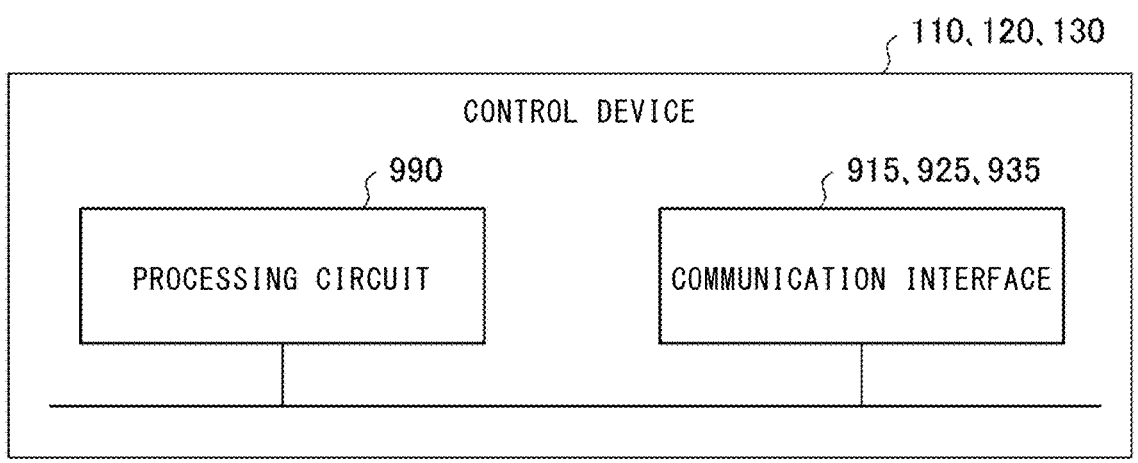
FIG. 16

MASTER CONTROL DEVICE AND SYNCHRONOUS COMMUNICATION SYSTEM USING SAME

BACKGROUND OF THE INVENTION

1. Field of the Invention

The present invention relates to a master control device that performs timing synchronization of a plurality of control devices connected thereto via a network, and a synchronous communication system using the master control device.

2. Description of the Background Art

In recent years, in a system in which a plurality of control devices are connected via a network and perform communication, for example, in a vehicle or the like, the respective control devices exchange data therebetween and control is required to be performed by combining these data.

Generally, each control device is equipped with an independent timer and determines timing of calculation or control processing on the basis of the timer. In the case where a plurality of control devices operate in conjunction with each other, it is necessary to synchronize timing of calculation or control processing of each control device.

In particular, in a control system that requires high-accuracy control, a deviation of timing of each control device has a large effect. In addition, not only during actual operation but also at the stage of development, it is useful to synchronize the control devices. At the time of occurrence of a problem, the problem may be reproduced to identify the cause for the problem, and a deviation of timing of each control device increases a time taken to reproduce the problem.

Due to such a background, when a plurality of control devices perform communication via a network, the need for timing synchronization, that is, for synchronizing timers of the respective control devices to adjust timing of calculation or control processing, is increased.

Patent Document 1 discloses a method in which a master control device and two or more slave control devices are specified, a local timer value of the slave control device is adjusted to a local timer value of the master control device, the local timer value of the master control device is then adjusted to the local timer value of the slave control device, and then each of the other slave control devices that receive the local timer value of the slave control device calculates the time difference between the received local timer value of the slave control device and an own local time value and adds the time difference to the local timer value of the master control device.

Patent Document 2 discloses a method in which a high-accuracy oscillator is not provided to each control device and an accurate time having less error is shared by the control devices.

In Patent Document 2, a master control device that operates on the basis of a reference clock signal supplied from a crystal oscillator outputs a cyclic pulse width modulation (PWM) signal. Each slave control device connected to the master control device via a shared bus detects a falling edge of the PWM signal, generates a reference clock having a cycle corresponding to an edge interval, via a clock generation circuit provided therein, operates on the basis of the clock, and synchronizes time with that of the master control device by correcting a time clocked by the slave control device on the basis of time information included in the PWM signal.

Patent Document 1: Japanese Laid-Open Patent Publication No. 2004-64123 (pages 9 to 12, FIG. 4)

Patent Document 2: Japanese Laid-Open Patent Publication No. 2015-23345 (pages 5 to 9, FIG. 4)

In Patent Document 1, in order to complement communication by collision of messages or the like at the time of transmission of the local timer value, the time difference between the local timer value of the slave control device that is received by each of the other slave control devices and the own local time value is added to the local timer value of the master control device.

Accordingly, the timers of the respective control devices can be synchronized. This means that the timers in the closed system are synchronized, so that synchronization with the real time cannot be achieved.

In addition, correction due to a delay of communication is performed, but a delay of processing or the like within a central processing unit (CPU) other than communication is not taken into consideration. Thus, an error is included in the local timer value transmitted by each control device, and if the respective local timer values include different errors, there is a possibility that times of the respective control devices are not accurately synchronized.

In Patent Document 2, since the timers of the slave control devices are synchronized on the basis of the PWM signal transmitted from the master control device, synchronization with the real time can be achieved in the entire system.

In addition, regarding a delay time at the time of time correction, Patent Document 2 indicates that a time lag from the time when a local timer value is generated by the master control device to the time when time correction based on this local timer value is performed by the slave control device is taken into consideration.

However, Patent Document 2 does not disclose a specific method for calculating a time lag and taking the time lag into consideration.

Moreover, a timing synchronization method is also specified in automotive open system architecture (AUTOSAR), which is a standard for automobile software.

However, similar to Patent Document 1, a delay time until a master control device completes transmission of a message and a delay time until each slave control device sends a notification of reception of the message are taken into consideration, but delays other than a calculation processing delay and a communication delay are not taken into consideration.

Moreover, each slave control device includes a means for confirming synchronization with the received local time of the master control device, but the received local time of the master control device includes uncertainties, and thus synchronization with this local time cannot necessarily be considered to ensure proper synchronization between the master control device and the slave control device.

SUMMARY OF THE INVENTION

The present invention has been made to solve the above-described problems, and an object of the present invention is to provide a master control device that can confirm timing synchronization of a plurality of slave control devices connected thereto via a network, and a synchronous communication system using the master control device.

A master control device according to the present invention is a master control device connected to a plurality of slave control devices via a network, the master control device including: a master-side timing synchronization unit for including an own local time in a first message and transmitting the first message to the slave control devices; a message reception difference calculation unit for calculating a difference between a reception time of a second message transmitted from the slave control device at a timing corrected in accordance with the local time and a pre-calculated message reception predicted time; and a timing correction amount calculation unit for calculating a correction amount for timing of the slave control devices by using the difference calculated by the message reception difference calculation unit.

According to the present invention, since the master control device is a master control device connected to a plurality of slave control devices via a network, the master control device including: a master-side timing synchronization unit for including an own local time in a first message and transmitting the first message to the slave control devices; a message reception difference calculation unit for calculating a difference between a reception time of a second message transmitted from the slave control device at a timing corrected in accordance with the local time and a pre-calculated message reception predicted time; and a timing correction amount calculation unit for calculating a correction amount for timing of the slave control devices by using the difference calculated by the message reception difference calculation unit, timing synchronization of the plurality of slave control devices connected via the network can be confirmed, and correction can be performed when such synchronization has not been achieved.

BRIEF DESCRIPTION OF THE DRAWINGS

FIG. 6 is a diagram showing schedule tables managed by the slave control devices of the synchronous communication system according to Embodiment 1 of the present invention;

FIG. 7 is a diagram showing tasks and activation timings thereof on the schedule table managed by the slave control device of the synchronous communication system according to Embodiment 1 of the present invention;

FIG. 9 is a diagram showing a database in the master control device of the synchronous communication system according to Embodiment 1 of the present invention;

FIG. 14 is a diagram showing a relationship between count number and provisional correction amount of the master control device of the synchronous communication system according to Embodiment 1 of the present invention;

FIG. 15 is a flowchart showing a process of adding, to timing synchronization, a process of adding an offset term for timing synchronization correction of the master control device of the synchronous communication system according to Embodiment 1 of the present invention; and FIG. 16 is a configuration diagram showing the case where the functions of the control devices of the synchronous communication system according to Embodiment 1 of the present invention are implemented by hardware.

DETAILED DESCRIPTION OF THE PREFERRED EMBODIMENTS OF THE INVENTION

Embodiment 1

Hereinafter, an embodiment of a synchronous communication system will be described with reference to the drawings.

Figure 1:
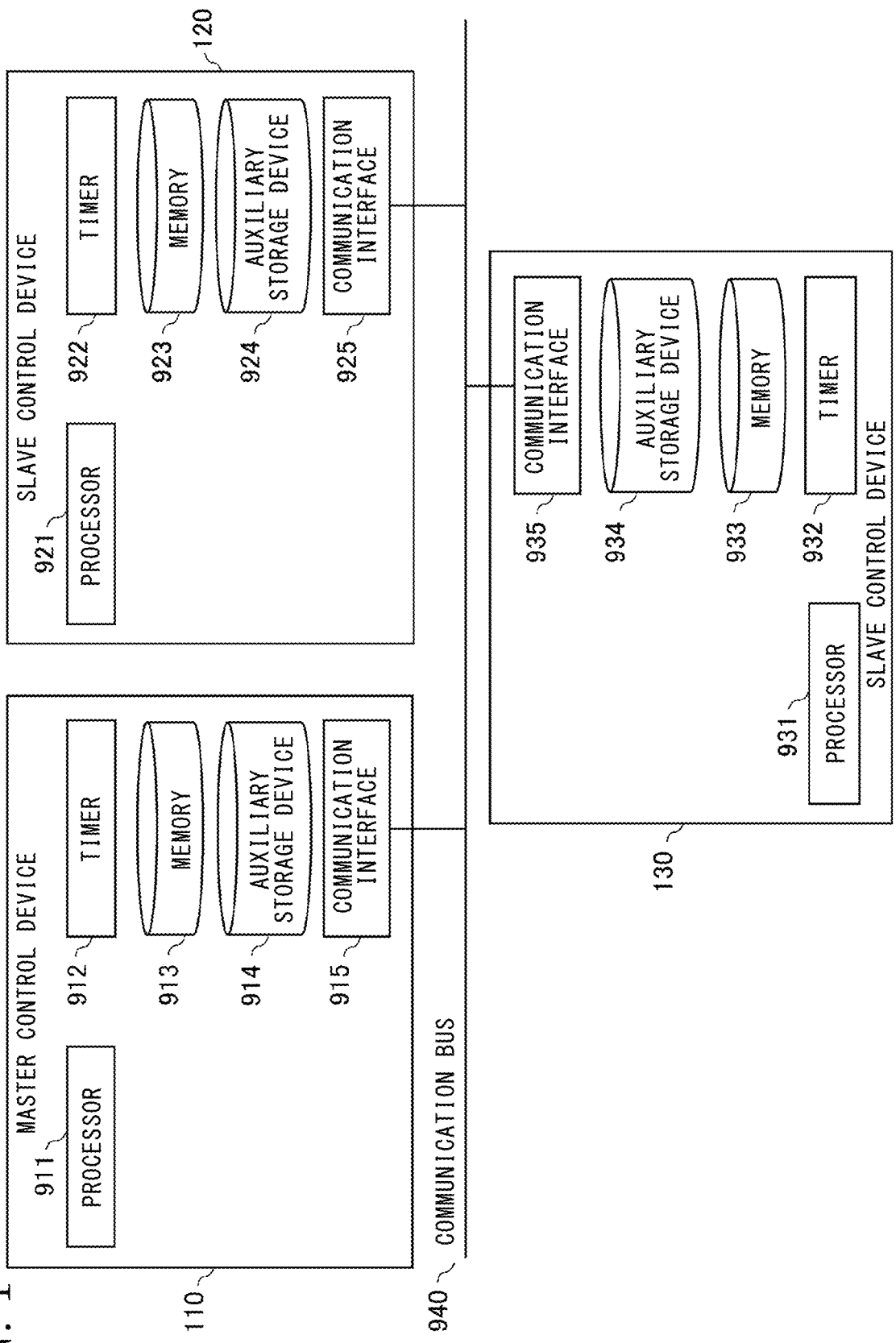
FIG. 1 is a schematic configuration diagram showing a synchronous communication system according to Embodiment 1 of the present invention.

FIG. 1 is a schematic configuration diagram showing a synchronous communication system according to Embodiment 1 of the present invention.

In FIG. 1, the synchronous communication system includes a master control device 110, a slave control device 120, and a slave control device 130. The master control device 110, the slave control device 120, and the slave control device 130 are connected to each other by a communication bus 940, for example, a control area network (CAN) bus.

The master control device 110, the slave control device 120, and the slave control device 130 are collectively referred to as control devices.

The master control device 110 is configured as follows.

The master control device 110 includes hardware devices, that is, a processor 911, a timer 912, a memory 913, an auxiliary storage device 914, and a communication interface 915 that will be described later. These hardware devices are connected to each other via a signal line.

The processor 911 is an integrated circuit (IC) that performs calculation processing and controls the other hardware devices. For example, the processor 911 is a CPU, a digital signal processor (DSP), or a graphics processing unit (GPU).

The timer 912 counts a clock signal from an oscillating circuit. The oscillating circuit is, for example, a crystal oscillator or a ceramic vibrator.

The memory 913 is a volatile storage device. The memory 913 is also referred to as main storage device or main memory. For example, the memory 913 is a random access memory (RAM). Data stored in the memory 913 is stored in the auxiliary storage device 914 as necessary.

The auxiliary storage device 914 is a nonvolatile storage device. For example, the auxiliary storage device 914 is a read only memory (ROM), a hard disk drive (HDD), or a flash memory. Data stored in the auxiliary storage device 914 is loaded into the memory 913 as necessary.

The communication interface 915 is, for example, a controller area network (CAN), a local interconnect network (LIN), FlexRay (registered trademark), or Ethernet (registered trademark).

The slave control device 120 is configured as follows.

Hardware devices, that is, a processor 921, a timer 922, a memory 923, an auxiliary storage device 924, and a communication interface 925, are connected to each other via a signal line.

The processor 921, the timer 922, the memory 923, the auxiliary storage device 924, and the communication interface 925 are similar to the processor 911, the timer 912, the memory 913, the auxiliary storage device 914, and the communication interface 915, respectively.

Also in the slave control device 130, similar to the slave control device 120, hardware devices, that is, a processor 931, a timer 932, a memory 933, an auxiliary storage device 934, and a communication interface 935, are connected to each other via a signal line.

The processor 931, the timer 932, the memory 933, the auxiliary storage device 934, and the communication interface 935 are similar to the processor 911, the timer 912, the memory 913, the auxiliary storage device 914, and the communication interface 915, respectively.

Figure 2:
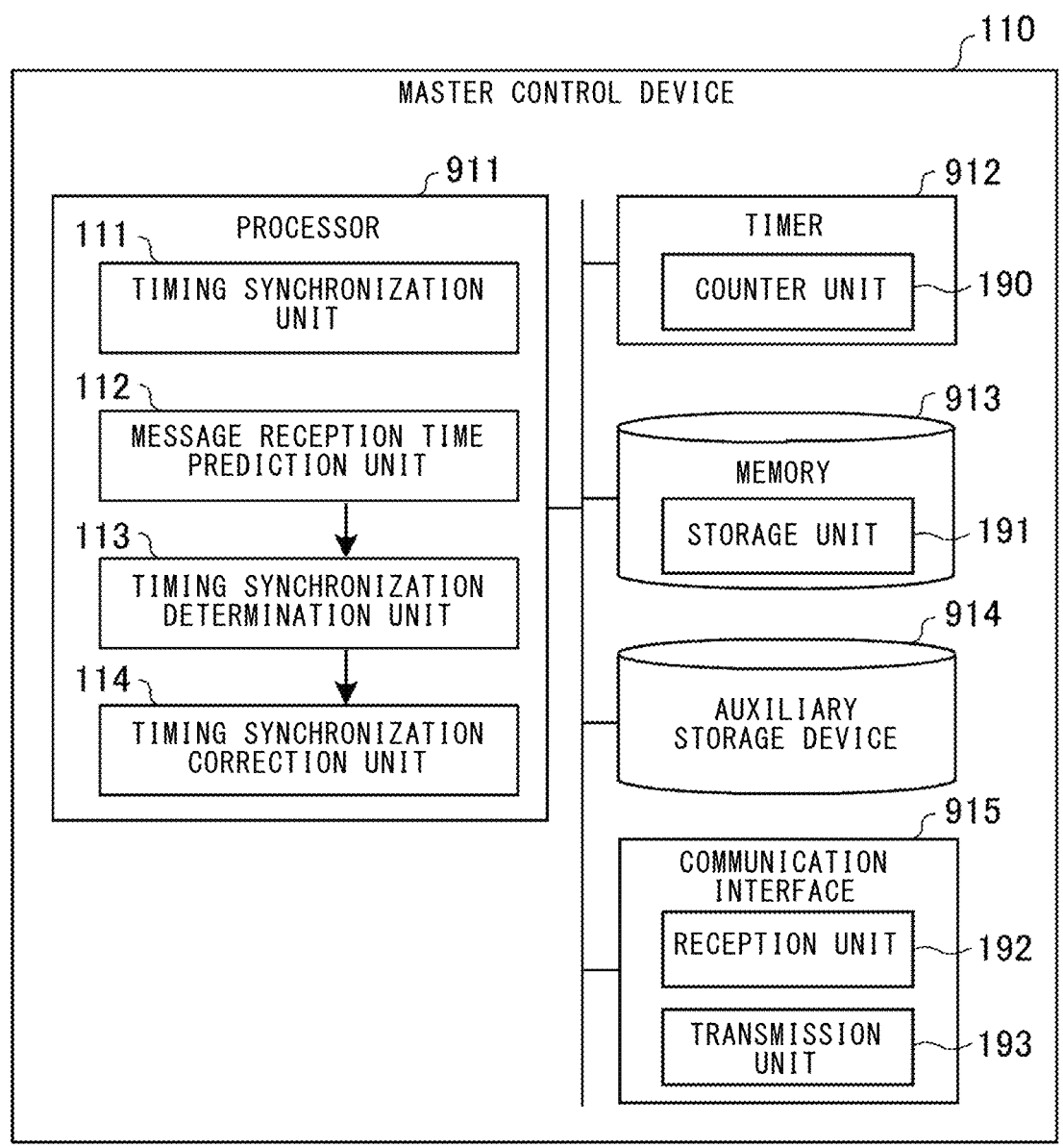
FIG. 2 is a functional configuration diagram showing a master control device of the synchronous communication system according to Embodiment 1 of the present invention.

FIG. 2 is a functional configuration diagram showing the master control device of the synchronous communication system according to Embodiment 1 of the present invention.

In FIG. 2, reference characters 110 and 911 to 915 denote the same components as in FIG. 1. The master control device 110 in FIG. 2 includes software elements, that is, a timing synchronization unit 111 (master-side timing synchronization unit), a message reception time prediction unit 112, a timing synchronization determination unit 113 (message reception difference calculation unit), a timing synchronization correction unit 114 (timing correction amount calculation unit) that will be described later. Here, the software elements are elements implemented by software.

In the auxiliary storage device 914, a timing synchronization (master) program for performing the function of the timing synchronization unit 111, the message reception time prediction unit 112, the timing synchronization determination unit 113, and the timing synchronization correction unit 114 is stored. The timing synchronization (master) program is loaded into the memory 913 and executed by the processor 911.

In addition, in the auxiliary storage device 914, an operation system (OS) is stored. At least a part of the OS is loaded into the memory 913 and executed by the processor 911.

That is, the processor 911 executes the timing synchronization (master) program by executing the OS.

Data obtained by executing the timing synchronization (master) program is stored in a storage device such as the memory 913, the auxiliary storage device 914, a register in the processor 911, or a cache memory in the processor 911.

The timer 912 functions as a counter unit 190 that counts a clock signal and converts the count to a time.

The memory 913 functions as a storage unit 191 that stores data. However, another storage device may function as the storage unit 191 instead of the memory 913 or together with the memory 913.

The communication interface 915 functions as: a reception unit 192 that receives a message flowing on the communication bus and converts the message from an analog signal to a digital signal to acquire data; and a transmission unit 193 that converts a digital signal to an analog signal and transmits a message complying with a specified protocol, onto the communication bus.

Figure 3:
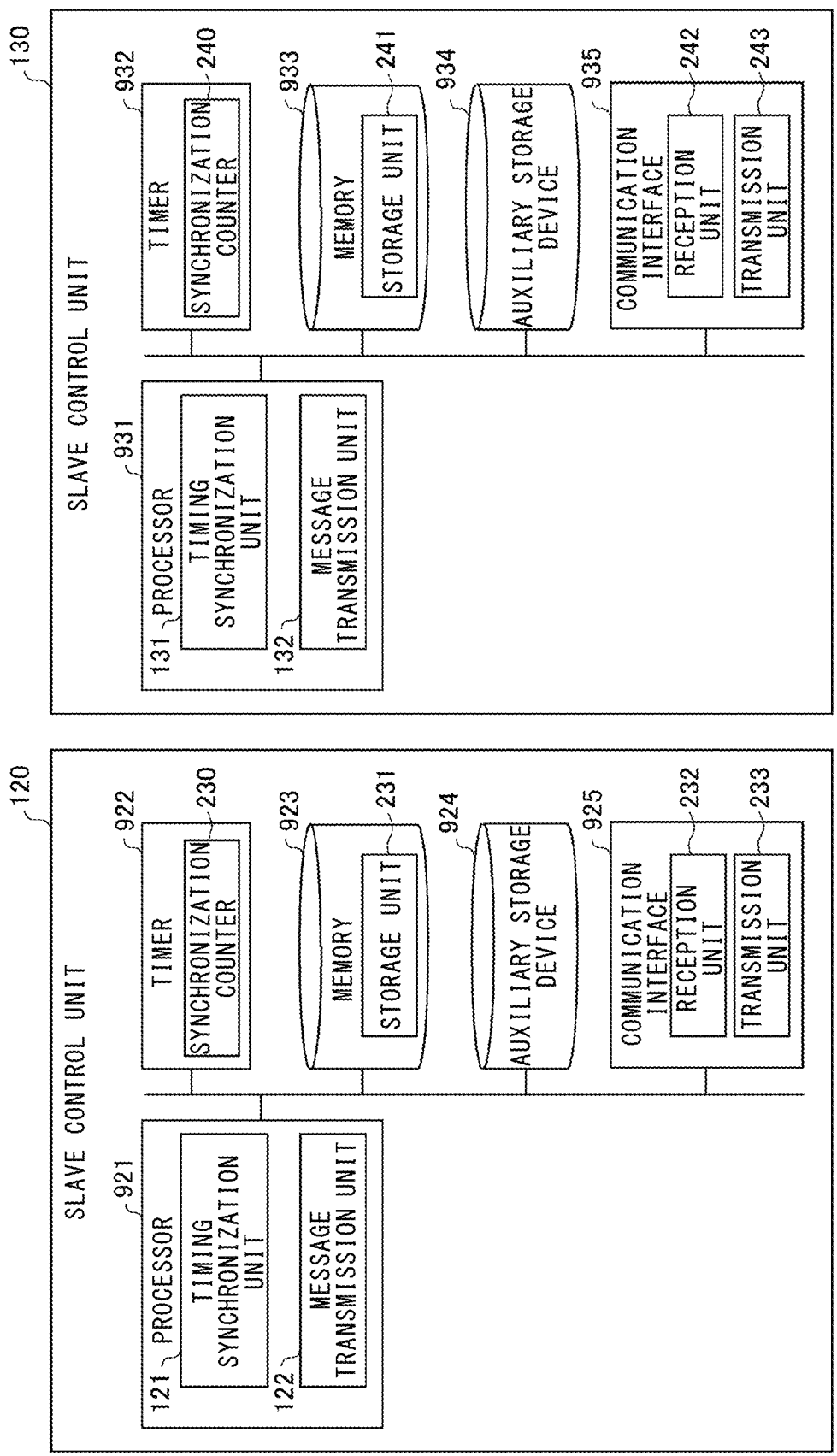
FIG. 3 is a functional configuration diagram showing slave control devices of the synchronous communication system according to Embodiment 1 of the present invention.

FIG. 3 is a functional configuration diagram showing the slave control devices of the synchronous communication system according to Embodiment 1 of the present invention.

In FIG. 3, reference characters 120, 130, 921 to 925, and 931 to 935 denote the same components as in FIG. 1.

The slave control devices 120 and 130 include software elements, that is, timing synchronization units 121 and 131 (slave-side timing synchronization units) and message transmission units 122 and 132, respectively.

In the respective auxiliary storage devices 924 and 934 of the slave control devices 120 and 130, timing synchronization (slave) programs for performing the function of the timing synchronization units 121 and 131 and the message transmission units 122 and 132 are stored. The respective timing synchronization (slave) programs are loaded into the respective memories 923 and 933 and executed by the corresponding processors 921 and 931.

In addition, OSs are stored in the respective auxiliary storage devices 924 and 934. At least parts of the OSs are loaded into the respective memories 923 and 933 and executed by the corresponding processors 921 and 931.

That is, the respective processors 921 and 931 execute the timing synchronization (slave) programs by executing the OSs.

The timer 922 of the slave control device 120 and the timer 932 of the slave control device 130 respectively function as synchronization counters 230 and 240 each of which counts a clock signal and converts the count to a time.

The memory 923 of the slave control device 120 and the memory 933 of the slave control device 130 respectively function as storage units 231 and 241 that store data. However, other storage devices may function as the storage units 231 and 241 instead of the memories 923 and 933 or together with the memories 923 and 933.

The communication interfaces 925 and 935 of the slave control devices 120 and 130 respectively function as: reception units 232 and 242 each of which receives a message flowing on the communication bus and converts the message from an analog signal to a digital signal to acquire data; and transmission units 233 and 243 each of which converts a digital signal to an analog signal and transmits a message complying with a specified protocol, onto the communication bus.

FIG. 6 is a diagram showing schedule tables managed by the slave control devices of the synchronous communication system according to Embodiment 1 of the present invention.

In FIG. 6, schedule table information 200 that is information on a schedule table managed by each of the OSs of the slave control devices 120 and 130 is shown, and a cycle 210 of the schedule table, tasks to be activated on the schedule table, and activation timings thereof are described. Schedule tables 201 and 202 correspond to the slave control devices 120 and 130, respectively.

The schedule tables 201 and 202 are stored in the auxiliary storage devices 924 and 934 of the corresponding slave control devices, loaded onto the memories, and read out.

Tasks 211 to 214 will be described with reference to FIG. 7.

In the cells of slave control device, identification numbers 1 and 2 are stored. Here, the identification number 1 indicates the slave control device 120, and the identification number 2 indicates the slave control device 130. The same applies to FIGS. 9, 12, and 14 that will be described later.

FIG. 7 is a diagram showing the tasks and the activation timings thereof on the schedule table managed by the slave control device of the synchronous communication system according to Embodiment 1 of the present invention.

In FIG. 7, the tasks and the activation timings thereof shown in the schedule table 201 of the slave control device 120 in the schedule table information 200 shown in FIG. 6 are shown.

FIG. 7 shows that in a cycle of 10 ms of the schedule table, the communication monitoring task 211 is activated at 3 ms, the message transmission task 212 is activated at 5 ms, the control application 1 task 213 is activated at 7 ms, and the memory management task 214 is activated at 9 ms.

Figure 8:
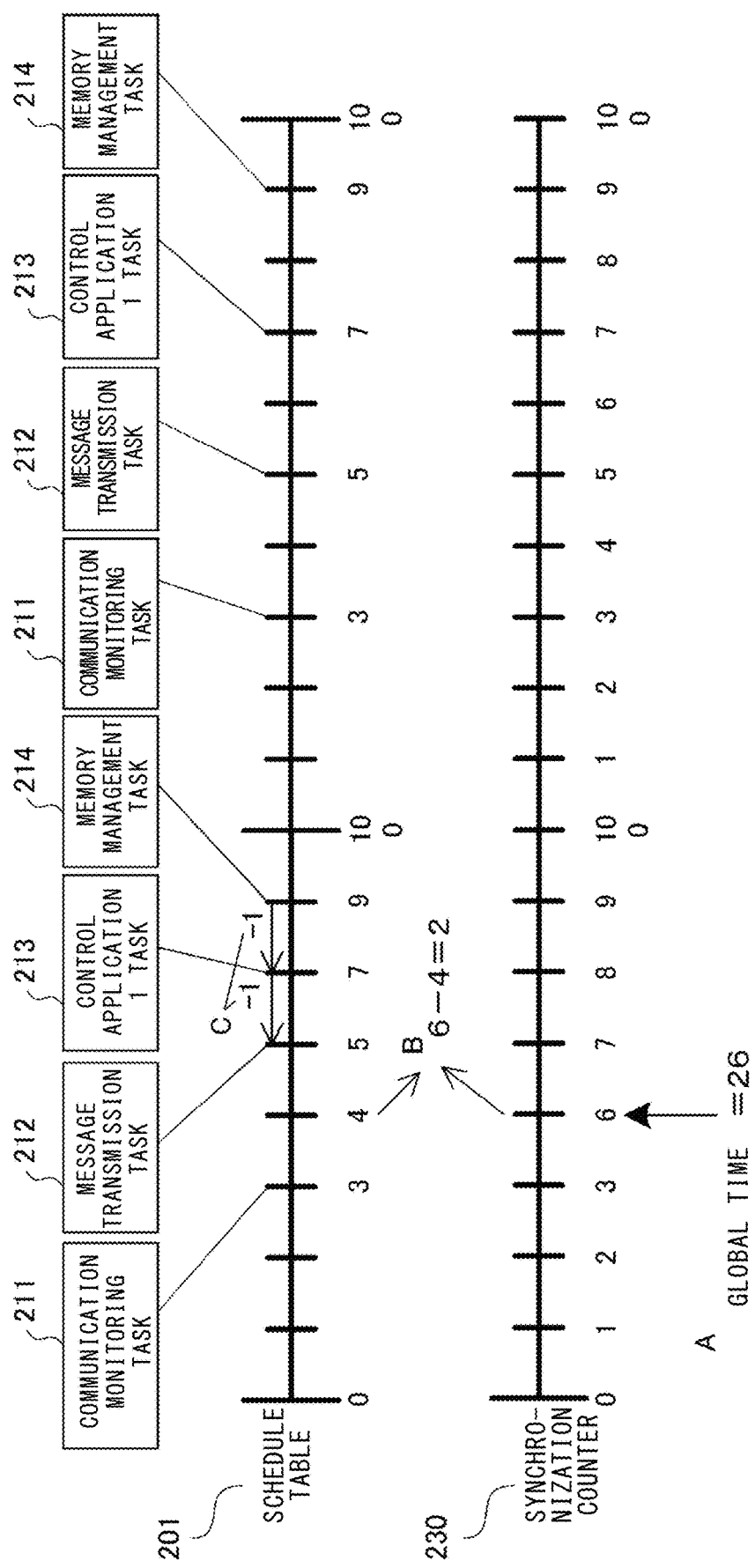
FIG. 8 is a diagram showing a synchronization counter and activation timings of the tasks on the schedule table of the slave control device of the synchronous communication system according to Embodiment 1 of the present invention.

FIG. 8 is a diagram showing the synchronization counter and the activation timings of the tasks on the schedule table of the slave control device of the synchronous communication system according to Embodiment 1 of the present invention.

In FIG. 8, the synchronization counter 230 in the slave control device 120 and the activation timings of the tasks managed on the schedule table 201 are shown. The cycle of the synchronization counter 230 is "10", which is equal to the cycle 210 of the schedule table 201. A, B, and C will be described later.

FIG. 9 is a diagram showing a database in the master control device of the synchronous communication system according to Embodiment 1 of the present invention.

In FIG. 9, a database 300 is stored in the auxiliary storage device 914 of the master control device 110. The database 300 has the cycles of the schedule tables, activation timings of message transmission tasks, message identifiers, message delay times, and thresholds for predicted times of the respective slave control devices 120 and 130. The message identifiers, the message delay times, and the thresholds for predicted times will be described later.

Figure 11:
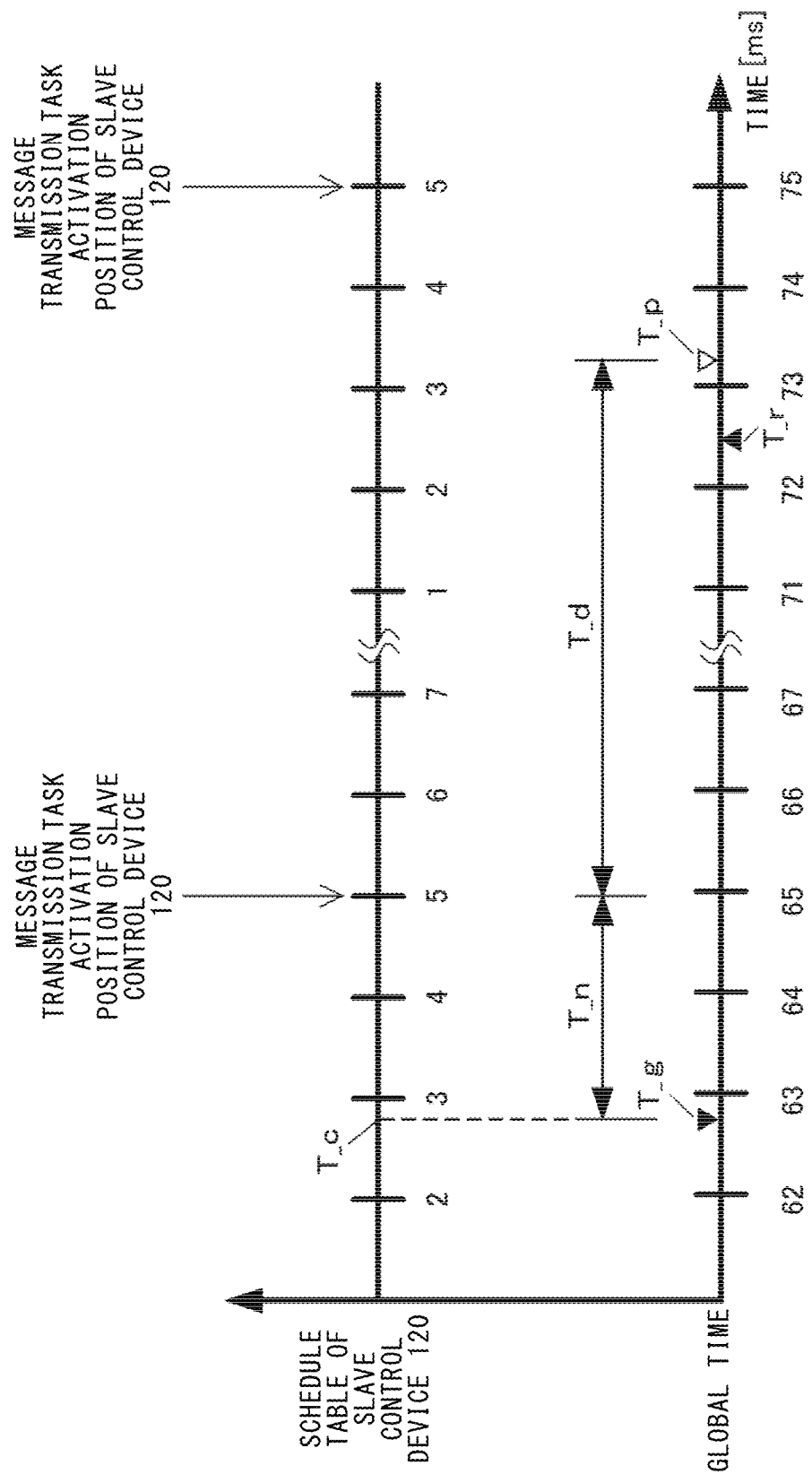
FIG. 11 is a diagram showing a timing synchronization confirmation process of the master control device of the synchronous communication system according to Embodiment 1 of the present invention.

FIG. 11 is a diagram showing a timing synchronization confirmation process of the master control device of the synchronous communication system according to Embodiment 1 of the present invention.

In FIG. 11, the schedule table of the slave control device 120 and a global time are shown, and a message transmission task activation position on the schedule table is shown.

Furthermore, a global time T_g, a message reception time T_r, a message reception predicted time T_p, a position T_c on the schedule table, an activation waiting time T_n, and a message delay time T_d that will be described later are shown.

Figures 12, 13:
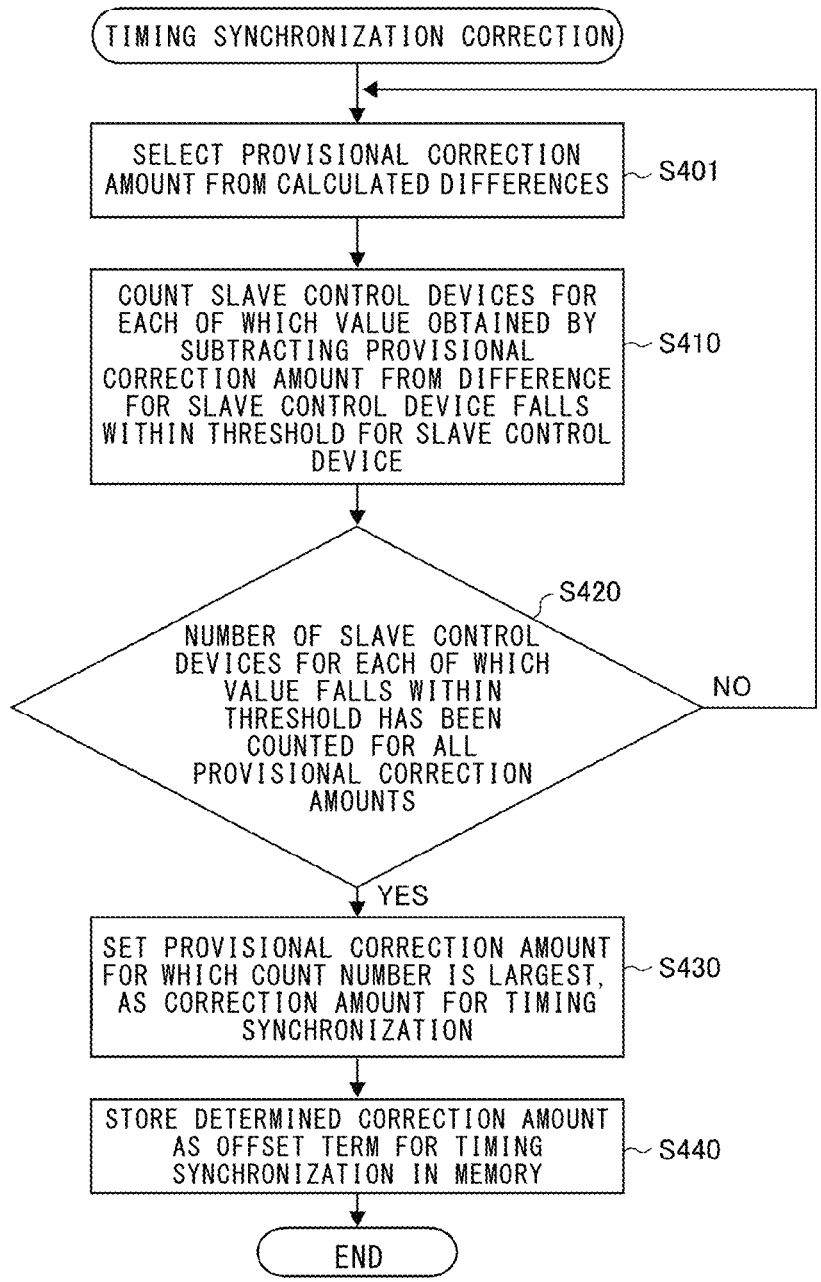
FIG. 12 is a diagram showing a timing synchronization confirmation result of the master control device of the synchronous communication system according to Embodiment 1 of the present invention.
FIG. 13 is a flowchart showing a timing synchronization correction process of the master control device of the synchronous communication system according to Embodiment 1 of the present invention.

FIG. 12 is a diagram showing a timing synchronization confirmation result of the master control device of the synchronous communication system according to Embodiment 1 of the present invention.

In FIG. 12, a timing synchronization confirmation result 400 has message reception predicted times, message reception times, and differences of the respective slave control devices 120 and 130, and also has the thresholds for predicted times held in the database 300.

FIG. 14 is a diagram showing a relationship between count number and provisional correction amount of the master control device of the synchronous communication system according to Embodiment 1 of the present invention.

In FIG. 14, provisional correction amounts and count numbers of the respective slave control devices 120 and 130 are shown. Here, each count number is a number obtained by counting slave control devices for each of which a result obtained by subtracting the provisional correction amount from a difference dt of the slave control device 120 or 130 falls within the threshold provided for the slave control device.

Next, operation will be described.

First, a master-side timing synchronization process by the timing synchronization unit 111 of the master control device 110 will be described with reference to FIG. 4.

In step S101, the counter unit 190 acquires a local time, and the storage unit 191 stores the acquired local time therein. The local time acquired by the master control device 110 is defined as a global time in order to synchronize timing of calculation processing or control of the slave control device 120 and the slave control device 130 with the local time acquired by the master control device 110.

Next, in step S102, in a message transmission task that is specified in the master control device 110 and managed by the OS, the global time stored in the storage unit 191 is stored in a designated message (first message) (hereinafter, timing synchronization message), and the timing synchronization message having the global time stored therein is transmitted to the slave control devices 120 and 130. The timing synchronization message is identified, for example, by an identifier included in the message.

Figure 5:
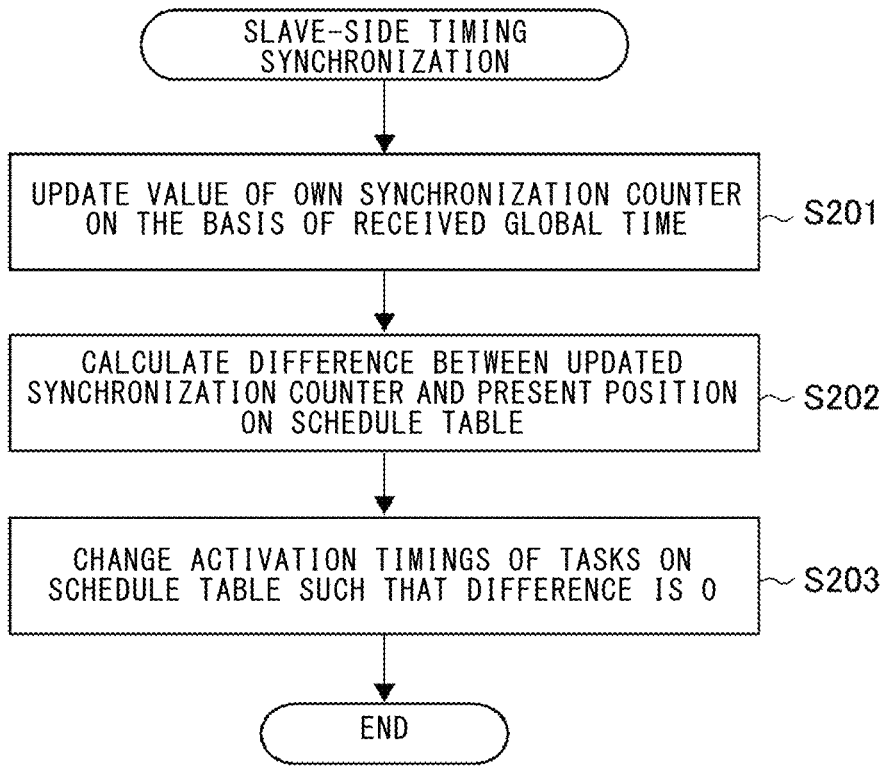
FIG. 5 is a flowchart showing a timing synchronization process of each slave control device of the synchronous communication system according to Embodiment 1 of the present invention.

Next, a slave-side timing synchronization process by each of the timing synchronization units 121 and 131 of the slave control devices 120 and 130 will be described with reference to FIG. 5.

In step S201, the timing synchronization message transmitted by the master control device 110 is received, and the global time is extracted therefrom. The extracted global time is converted to the cycle of the synchronization counter managed by each of the OSs of the slave control devices 120 and 130, and the value of the synchronization counter of each of the slave control devices 120 and 130 is updated with the value resulting from the conversion.

Here, the conversion to the cycle refers to conversion of the value of the global time to a corresponding position in the cycle of each of the synchronization counters 230 and 240.

The cycles of the synchronization counters 230 and 240 are equal to the cycles of the schedule tables, and the activation timings of the tasks managed on the schedule tables is determined by the values of the synchronization counters 230 and 240.

Next, in step S202, the difference between the updated synchronization counter value and the present position on the schedule table specified in each of the slave control devices 120 and 130 is calculated.

In step S203, the activation timings of the tasks managed on the schedule table specified in each of the slave control devices 120 and 130 is changed in accordance with the calculated difference.

In a specific method for the change, the activation timings of the tasks are shifted from specified values, in the order of tasks closer to the present position on the schedule table, among the tasks managed on the schedule table. A restriction can be provided to a width by which the timing is shifted.

Control timing of the slave control devices 120 and 130 is synchronized with control timing of the master control device 110 by the slave control devices 120 and 130 performing steps S201 to S203.

Next, the timing synchronization process by each of the slave control devices 120 and 130 shown in steps S201 to S203 in FIG. 5 will be described by means of a specific example with reference to FIGS. 6 to 8.

In the schedule tables in FIG. 6 managed by the respective OSs of the slave control devices 120 and 130, the cycles of the schedule tables, the tasks to be activated on the schedule tables, and the activation timings thereof are shown.

The respective schedule tables 201 and 202 in the schedule table information 200 in FIG. 6 are stored in the respective auxiliary storage devices 924 and 934 of the slave control devices 120 and 130, loaded onto the memories, and read out.

In the schedule table 201 of the slave control device 120 in FIG. 7, the tasks and the activation timings thereof shown in schedule table 201 in the schedule table information 200 in FIG. 6 are shown together with the cycle 210 of the schedule table. In a specific example, timing synchronization between the master control device 110 and the slave control device 120 is shown.

Next, FIG. 8 will be described in detail.

FIG. 8 shows the synchronization counter 230 in the slave control device 120 and the activation timings of the tasks managed on the schedule table, and the cycle of the synchronization counter 230 is "10", which is equal to the cycle 210 of the schedule table.

At A in FIG. 8, it is shown that the synchronization counter 230 is converted to the global time transmitted by the master control device 110. In the case where the global time is "26", when the global time is converted to the cycle of the synchronization counter 230, "6" is obtained, and the synchronization counter value is updated from "4" to "6". This process corresponds to step S201.

Next, at B in FIG. 8, the present position on the schedule table is "4" and the updated synchronization counter value is "6", and thus a difference is calculated as "2". This shows that the control timing of the slave control device 120 is earlier by "2" than the control timing of the master control device 110. This process corresponds to step S202.

Next, at C in FIG. 8, the activation timing of the control application 1 task 213 and the memory management task 214 close to the present position on the schedule table 201, among the tasks managed on the schedule table 201, are made earlier by "1" than specified values such that the difference calculated at B becomes "0" (the activation timing of the message transmission task 212 the activation timing of which is to be skipped when activation is performed earlier by "1" from the specified values is not changed).

The maximum width by which the activation timing of each task is made earlier or delayed from the specified value is set to "1", for example. This process corresponds to step S203.

The activation timings of the tasks managed on the schedule table 201 specified in the slave control device 120 is synchronized with the synchronization counter 230 by performing the timing synchronization process as in FIG. 8. That is, the control timing of the slave control device 120 and the control timing of the master control device 110 are synchronized with each other.

In the above, the timing synchronization between the master control device 110 and the slave control device 120 has been described. However, similarly, timing synchronization between the master control device 110 and the slave control device 130 can be achieved by the slave control device 130 performing a similar process.

In addition, the above-described method for the timing synchronization between the master control device 110 and the slave control device 120 is a method complying with AUTOSAR, and in Embodiment 1, the master control device 110 and the slave control devices 120 and 130 have a timing synchronization method complying with AUTOSAR or a method equivalent thereto.

Next, timing synchronization confirmation and timing synchronization correction by the master control device 110 will be described in detail.

The database 300 in FIG. 9 has the detailed data of the schedule tables of the respective slave control devices 120 and 130 and a collection of data required for confirming timing synchronization, and is stored in the auxiliary storage device 914 of the master control device 110.

However, the database 300 stored in the auxiliary storage device 914 in advance may be loaded into the memory 913, the register in the processor 911, or the cache memory in the processor 911.

The database 300 in FIG. 9 has the cycles of the schedule tables, the activation timings of the message transmission tasks, the message identifiers, the message delay times, and the thresholds for predicted times of the respective slave control devices 120 and 130.

Here, as the cycles of the schedule tables and the activation timings of the message transmission tasks, those in the schedule table information 200 are used.

As for each message identifier, at least one message is selected from messages (second messages) transmitted by the message transmission tasks, and the identifier of the selected message is stored.

Each message delay time indicates the time from the time when the slave control device 120 or 130 transmits a message to the time when the master control device 110 receives the message. For example, each message delay time is a nominal value of a message delay time measured in advance for each slave control device.

Each threshold for a predicted time indicates an allowable width of a message reception predicted time described later. For example, similar to the message delay time, the time from the time when the slave control device 120 or 130 transmits a message to the time when the master control device 110 receives the message is measured in advance, and a standard deviation of the time is set as a threshold for a predicted time.

In addition, for example, the master control device 110 may be capable of communication with a device external to a vehicle and have a function to update the database 300 due to replacement or new addition of a slave control device, or the like.

Next, a timing synchronization confirmation process of the timing synchronization determination unit 113 of the master control device 110 will be described with reference to FIG. 10. FIG. 11 shows a specific example, and the master control device 110 confirms whether the timing of the slave control device 120 has been properly synchronized with the master control device 110.

Figure 10:
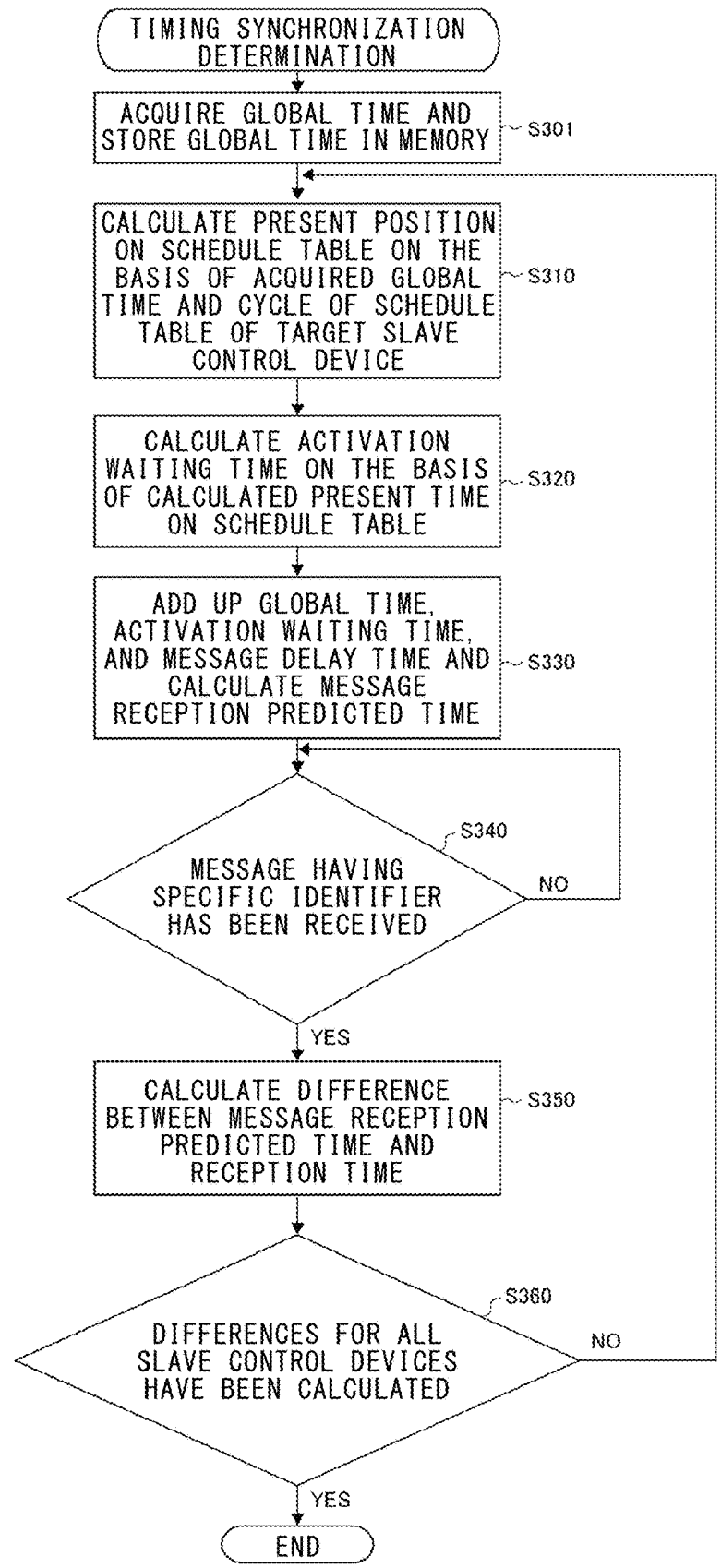
FIG. 10 is a flowchart showing a timing synchronization determination process of the master control device of the synchronous communication system according to Embodiment 1 of the present invention.

In step S301 in FIG. 10, the global time $T\_g$ that is the present time of the master control device 110 is acquired from the counter unit 190 of the timer 912, and the storage unit 191 stores the acquired global time $T\_g$ therein.

In FIG. 11, the global time $T\_g$, which is the present time, is 62.8 ms, and the storage unit 191 stores this value therein.

Next, in step S310 in FIG. 10, a cycle $T\_\#$ (# is the identification number 1 or 2 of the slave control device) of the schedule table of the slave control device that confirms timing synchronization with the master control device 110 (the slave control device 120 in the description) is read from the database 300 in the auxiliary storage device 914 into the memory 913.

The present position $T\_c$ on the schedule table in the case where the target slave control device has been properly synchronized with the master control device 110 is calculated on the basis of the cycle T_# of the schedule table read into the memory 913 and the global time T_g stored in the memory 913.

In FIG. 11, the present position T_c on the schedule table at the global time T_g=62.8 ms is calculated as 2.8 ms, since the cycle T_1 of the schedule table of the slave control device 120 is 10 ms from the database 300 in the auxiliary storage device 914.

Next, in step S320 in FIG. 10, the activation timing of the message transmission task of the target slave control device is read from the database 300 in the auxiliary storage device 914 into the memory 913. The activation waiting time T_n that is a time taken until the message transmission task is activated next is calculated on the basis of the activation timing read into the memory 913 and the present position T_c on the schedule table calculated in step S310. The storage unit 191 stores the calculated activation waiting time T_n therein.

The activation timing of the message transmission task 212 of the slave control device 120 is at 5 ms from the database 300 in the auxiliary storage device 914. In FIG. 11, the activation waiting time T_n is calculated as 2.2 ms, since the present position T_c on the schedule table is 2.8 ms.

Next, in step S330 in FIG. 10, the message delay time T_d of the target slave control device is read from the database 300 in the auxiliary storage device 914. The read message delay time T_d, the activation waiting time T_n calculated in step S320, and the global time T_g acquired in step S301 are added up, and the resultant value is set as the message reception predicted time T_p. The storage unit 191 stores the message reception predicted time T_p therein.

Since the message delay time T_d of the slave control device 120 is 8.3 ms, the activation waiting time T_n is 2.2 ms, and the global time T_g is 62.8 ms, the message reception predicted time T_p is calculated as 73.3 ms.

In FIG. 11, ∇ indicates the message reception predicted time T_p. The storage unit 191 stores the message reception predicted time T_p=73.3 ms therein.

The function of the message reception time prediction unit 112 of the master control device 110 corresponds to the process in steps S301 to S330.

Next, in step S340 in FIG. 10, the master control device 110 waits until receiving a message that is transmitted by the message transmission task of the target slave control device and that has an identifier specified in the database 300.

After the reception of the message, the master control device 110 acquires the message reception time T_r that is the time at which the message is received, and the storage unit 191 stores the message reception time T_r therein.

The message reception time T_r is acquired, for example, by accessing a register for time stamp using a time stamp function in which a timer value when a message is stored in a mail box of a CAN driver is written as a time stamp value.

Next, in step S350 in FIG. 10, the difference dt between the message reception time T_r and the message reception predicted time T_p is calculated.

In FIG. 11, the message reception time T_r of a message that is transmitted by the message transmission task 212 of the slave control device 120 and the identifier of which is 0x111 is 72.5 ms. In this case, since the message reception predicted time T_p=73.3 ms and the message reception time T_r=72.5 ms, the difference dt is calculated as 0.8 ms. Then, the storage unit 191 stores the difference dt=0.8 ms therein.

Next, in step S360 in FIG. 10, when all the differences of the slave control devices 120 and 130 which perform timing synchronization with the master control device 110 have been calculated, the timing synchronization confirmation process is ended.

When not all the differences have been calculated, the next target slave control device is determined, and steps S310 to S350 are repeated.

FIG. 12 shows a specific example of the timing synchronization confirmation result 400 obtained when the timing synchronization confirmation process shown in steps S301 to S360 in FIG. 10 is completed. The timing synchronization confirmation result 400 has the message reception predicted times T_p, the message reception times T_r, and the differences dt of the respective slave control devices 120 and 130, and also has the thresholds for predicted times held in the database 300.

The storage unit 191 stores the timing synchronization confirmation result 400 therein, and the timing synchronization confirmation result 400 is used for calculation for timing synchronization correction described later.

Next, a timing synchronization correction process of the timing synchronization correction unit 114 of the master control device 110 will be described with reference to FIG. 13.

In step S401 (a means for setting one of the differences as a provisional correction amount), one of the differences dt included in the timing synchronization confirmation result 400 stored in the storage unit 191 is selected. For example, 0.8 ms, which is the difference dt of the slave control device 120, is selected and set as a provisional correction amount, and the process proceeds to step S410.

In step S410 (a means for counting the number of slave control devices for each provisional correction amount), the provisional correction amount selected in step S401 is subtracted from the difference dt of each of the slave control devices 120 and 130. The number of slave control devices for each of which the result at this time falls within the threshold provided for the slave control device is counted.

Specifically, in the case where the provisional correction amount is 0.8 ms, 0.0 ms is obtained when the provisional correction amount is subtracted from the difference dt of the slave control device 120=0.8 ms, and −0.2 ms is obtained when the provisional correction amount is subtracted from the difference dt of the slave control device 130=0.6 ms.

In this case, the thresholds provided for the respective slave control devices 120 and 130 are 0.5 ms and 0.4 ms, the above results fall within the respective thresholds, and thus the count number is 2.

In addition, for the slave control device 130, the value obtained by subtracting the provisional correction amount from the difference dt is negative. The case where the value falls within the threshold and is negative is counted, so that the count number is 2(1).

However, for taking into consideration a delay of reception by the master control device 110 due to collision of messages on the bus or arbitration at the time of message transmission at the slave control device side, when the difference dt is negative and exceeds the upper limit of the threshold, this case is not included in the process in step S410.

Next, in step S420, when all the differences dt included in the timing synchronization confirmation result 400 have been selected and the count number has been calculated in Step S410 for all the differences dt, the process proceeds to step S430. When the count number has been calculated in step S410 for not all the differences dt, steps S401 and S410 are repeated.

FIG. 14 shows a relationship between the provisional correction amount and the count number calculated in step S410 when the process proceeds from step S420 to step S430.

Next, in step S430 (a means for determining the provisional correction amount for which the number of counts is the largest, as a correction amount), the provisional correction amount for which the calculated count number is the largest is set as a correction amount for timing synchronization.

In FIG. 14, the count number for the slave control device 120 is 2(0) and the count number for the slave control device 130 is 2(1), so that the maximum count number is 2, which is equal to both count numbers. In this case, 0.6 ms, which is the provisional correction amount for which the count number in which the value obtained by subtracting the provisional correction amount from the difference dt is negative is smaller, is selected.

In addition, when the count numbers in which the value obtained by subtracting the provisional correction amount from the difference dt is negative are also equal to each other, the count number for which the value of the provisional correction amount is the smallest is selected.

The process shown in steps S401 to S430 is an example in which a correction amount that minimizes a deviation of timing synchronization between the master control device 110 and each of the slave control devices 120 and 130 is selected. A correction amount may be calculated by using an optimization method such as steepest-descent method in which an objective function is defined and a decision variable is set as a correction amount.

In addition, data calculated as each of various items does not necessarily need to be one, and a plurality of data may be collected and then a correction amount may be calculated.

Next, in step S440, the storage unit 191 stores therein the determined correction amount as an offset term for timing synchronization. After the storing, the storage unit 191 holds the stored offset term until the master control device 110 performs the timing synchronization process.

In steps S401 to S440 of the timing synchronization correction process, the offset term required for timing synchronization correction is calculated and held in the memory.

Addition of the offset term calculated thereby is performed between step S101 and S102 of the master-side timing synchronization process as described later with reference to FIG. 15.

Figure 4:
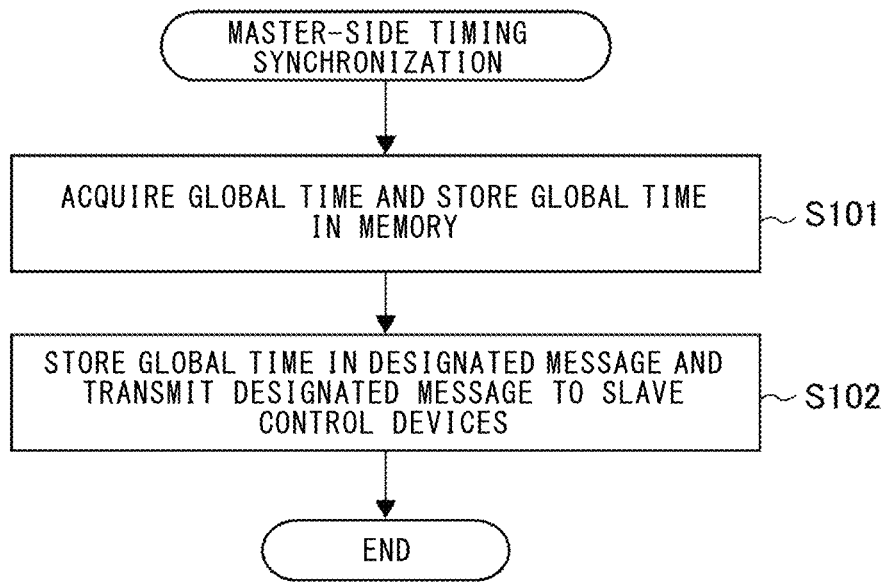
FIG. 4 is a flowchart showing a timing synchronization process of the master control device of the synchronous communication system according to Embodiment 1 of the present invention.

FIG. 15 is a flowchart obtained by adding a process of adding the offset term for timing synchronization correction (step S450) to the master-side timing synchronization process in FIG. 4.

In step S450 subsequent to step S101, the offset term stored in step S440 described above is added to the global time T_g acquired in step S101.

In step S102, since step S450 is added, a message obtained by providing the offset term to the global time included in the timing synchronization message is transmitted to the slave control device 120 and the slave control device 130.

By performing steps S401 to S440 of the timing synchronization correction process in FIG. 13 and steps S101 and S102 of the timing synchronization process including step S450, the timing synchronization correction by the master control device 110 is completed.

In addition, the slave control devices 120 and 130 can correct a deviation of timing synchronization with the master control device 110 by performing a similar process without changing steps S201 to S203 of the slave-side timing synchronization process.

According to Embodiment 1, the master control device can confirm that timing of calculation processing or control of each slave control device has been synchronized with that of the master control device, by using a message transmitted from each slave control device, and correction can be performed when such synchronization has not been achieved.

Accordingly, a deviation of timing synchronization between the respective control devices can be reduced, that is, high-accuracy control can be achieved in the control system that includes the respective control devices.

The master control device 110 and the slave control devices 120 and 130 described above (hereinafter, the respective control devices 110, 120, and 130) have the functions implemented by the software elements, but these software elements may be implemented by hardware. The configuration in this case will be described with reference to FIG. 16.

FIG. 16 is a configuration diagram showing the case where the function of each control device of the synchronous communication system according to Embodiment 1 of the present invention is implemented by hardware.

In FIG. 16, the respective control devices 110, 120, and 130 each have a processing circuit 990.

The processing circuit 990 in the master control device 110 is an electronic circuit dedicated for implementing the timing synchronization unit 111, the message reception time prediction unit 112, the timing synchronization determination unit 113, the timing synchronization correction unit 114, the counter unit 190, the storage unit 191, the reception unit 192, and the transmission unit 193.

In each of the slave control devices 120 and 130, the processing circuit 990 is an electronic circuit dedicated for implementing the timing synchronization unit 121 or 131, the message transmission unit 122 or 132, the synchronization counter 230 or 240, the storage unit 231 or 241, the reception unit 232 or 242, and the transmission unit 233 or 243.

For example, each processing circuit 990 is a single circuit, a composite circuit, a programmed processor, a parallel programmed processor, a logic IC, a gate array (GA), an application specific integrated circuit (ASIC), a field programmable gate array (FPGA), or a combination thereof.

The respective control devices 110, 120, and 130 may each include a plurality of processing circuits instead of the processing circuit 990. The plurality of processing circuits share the role of the processing circuit 990.

Although the present disclosure is described above in terms of an exemplary embodiment, it should be understood that the various features, aspects and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS 110 master control device
111 timing synchronization unit 112 message reception time prediction unit
113 timing synchronization determination unit
114 timing synchronization correction unit
120 slave control device
121 timing synchronization unit
122 message transmission unit
130 slave control device
131 timing synchronization unit
132 message transmission unit
190 counter unit
191 storage unit
192 reception unit
193 transmission unit
200 schedule table information
201 schedule table
202 schedule table
230 synchronization counter
231 storage unit
232 reception unit
233 transmission unit
240 synchronization counter
241 storage unit
242 reception unit
243 transmission unit
300 database
400 timing synchronization confirmation result
911 processor
912 timer
913 memory
914 auxiliary storage device
915 communication interface
921 processor
922 timer
923 memory
924 auxiliary storage device
925 communication interface
931 processor
932 timer
933 memory
934 auxiliary storage device
935 communication interface
940 communication bus
990 processing circuit

What is claimed is:

1. A master control device connected to a plurality of slave control devices via a network, the master control device comprising at least one processor comprising:
a master-side timing synchronizer for including an own local time in a first message and transmitting the first message to the slave control devices;
a message reception difference calculator for calculating a difference between a reception time of a second message transmitted from the slave control device at a timing corrected in accordance with the local time and a pre-calculated message reception predicted time; and
a timing correction amount calculator for calculating a correction amount for timing of the slave control devices by using the difference calculated by the message reception difference calculator,
wherein the pre-calculated message reception predicted time is set to a sum of the local time, a message delay time of the slave control device, and an activation waiting time that is a time taken until a message transmission task of the slave control device is activated to send the second message since receipt of the first message.

2. The master control device according to claim 1, wherein the correction amount calculated by the timing correction amount calculator is added to the local time and included in the first message, and the first message is transmitted by the master-side timing synchronizer to the slave control devices.

3. A master control device connected to a plurality of slave control devices via a network, the master control device comprising at least one processor comprising:
a master-side timing synchronizer for including an own local time in a first message and transmitting the first message to the slave control devices;
a message reception difference calculator for calculating a difference between a reception time of a second message transmitted from the slave control device at a timing corrected in accordance with the local time and a pre-calculated message reception predicted time;
a timing correction amount calculator for calculating a correction amount for timing of the slave control devices by using the difference calculated by the message reception difference calculator; and
a database in which information to be used for the calculation by the message reception difference calculator is stored, wherein
information of a schedule table for managing activation timing of a task of the slave control device transmitting the second message, and the pre-calculated message reception predicted time are stored in the database.

4. The master control device according to claim 2, further comprising a database in which information to be used for the calculation by the message reception difference calculator is stored, wherein
information of a schedule table for managing activation timing of a task of the slave control device transmitting the second message, and the pre-calculated message reception predicted time are stored in the database.

5. The master control device according to claim 3, further comprising a message reception time predictor for calculating the message reception predicted time by using the activation timing of the task on the schedule table stored in the database.

6. The master control device according to claim 4, further comprising a message reception time predictor for calculating the message reception predicted time by using the activation timing of the task on the schedule table stored in the database.

7. A master control device connected to a plurality of slave control devices via a network, the master control device comprising at least one processor comprising:
a master-side timing synchronizer for including an own local time in a first message and transmitting the first message to the slave control devices;
a message reception difference calculator for calculating a difference between a reception time of a second message transmitted from the slave control device at a timing corrected in accordance with the local time and a pre-calculated message reception predicted time; and
a timing correction amount calculator for calculating a correction amount for timing of the slave control devices by using the difference calculated by the message reception difference calculator, wherein
the message reception difference calculator calculates the difference for each of the slave control devices, and the timing correction amount calculator includes:
setting one of the differences of the plurality of slave control devices calculated by the message reception difference calculator, as a provisional correction amount;
comparing the difference of each slave control device with the provisional correction amount, and count the number of slave control devices for each of which a difference between the difference and the provisional correction amount is within a threshold, for each provisional correction amount; and
determining a provisional correction amount for which the number of counts is the largest, as the correction amount.

8. The master control device according to claim 2, wherein
the message reception difference calculator calculates the difference for each of the slave control devices, and
the timing correction amount calculator includes:
setting one of the differences of the plurality of slave control devices calculated by the message reception difference calculator, as a provisional correction amount;
comparing the difference of each slave control device with the provisional correction amount, and count the number of slave control devices for each of which a difference between the difference and the provisional correction amount is within a threshold, for each provisional correction amount; and
determining a provisional correction amount for which the number of counts is the largest, as the correction amount.

9. The master control device according to claim 3, wherein
the message reception difference calculator calculates the difference for each of the slave control devices, and
the timing correction amount calculator includes:
setting one of the differences of the plurality of slave control devices calculated by the message reception difference calculator, as a provisional correction amount;
comparing the difference of each slave control device with the provisional correction amount, and count the number of slave control devices for each of which a difference between the difference and the provisional correction amount is within a threshold, for each provisional correction amount; and
determining a provisional correction amount for which the number of counts is the largest, as the correction amount.

10. The master control device according to claim 4, wherein
the message reception difference calculator calculates the difference for each of the slave control devices, and
the timing correction amount calculator includes:
setting one of the differences of the plurality of slave control devices calculated by the message reception difference calculator, as a provisional correction amount;
comparing the difference of each slave control device with the provisional correction amount, and count the number of slave control devices for each of which a difference between the difference and the provisional correction amount is within a threshold, for each provisional correction amount; and
determining a provisional correction amount for which the number of counts is the largest, as the correction amount.

11. The master control device according to claim 5, wherein
the message reception difference calculator calculates the difference for each of the slave control devices, and
the timing correction amount calculator includes:
setting one of the differences of the plurality of slave control devices calculated by the message reception difference calculator, as a provisional correction amount;
comparing the difference of each slave control device with the provisional correction amount, and count the number of slave control devices for each of which a difference between the difference and the provisional correction amount is within a threshold, for each provisional correction amount; and
determining a provisional correction amount for which the number of counts is the largest, as the correction amount.

12. The master control device according to claim 6, wherein
the message reception difference calculator calculates the difference for each of the slave control devices, and
the timing correction amount calculator includes:
setting one of the differences of the plurality of slave control devices calculated by the message reception difference calculator, as a provisional correction amount;
comparing the difference of each slave control device with the provisional correction amount, and count the number of slave control devices for each of which a difference between the difference and the provisional correction amount is within a threshold, for each provisional correction amount; and
determining a provisional correction amount for which the number of counts is the largest, as the correction amount.

13. A synchronous communication system comprising:
the master control device according to claim 1; and
a plurality of slave control devices connected to the master control device via a network and performing timing synchronization with the master control device.

14. A synchronous communication system comprising:
the master control device according to claim 2; and
a plurality of slave control devices connected to the master control device via a network and performing timing synchronization with the master control device.

15. A synchronous communication system comprising:
the master control device according to claim 3; and
a plurality of slave control devices connected to the master control device via a network and performing timing synchronization with the master control device.

16. A synchronous communication system comprising:
the master control device according to claim 4; and
a plurality of slave control devices connected to the master control device via a network and performing timing synchronization with the master control device.

17. A synchronous communication system comprising:
the master control device according to claim 5; and
a plurality of slave control devices connected to the master control device via a network and performing timing synchronization with the master control device.

18. A synchronous communication system comprising:
the master control device according to claim 6; and
a plurality of slave control devices connected to the master control device via a network and performing timing synchronization with the master control device.

19. A synchronous communication system comprising:
the master control device according to claim 7; and
a plurality of slave control devices connected to the master control device via a network and performing timing synchronization with the master control device.

20. The synchronous communication system according to claim 13, wherein each of the slave control devices includes:
a schedule table for managing activation timing of a task of transmitting the second message; and
a slave-side timing synchronizer for correcting the activation timing of the task on the schedule table in accordance with the local time included in the first message transmitted from the master control device, and transmitting the second message to the master control device.

* * * * *